United States Patent [19]

Wegmüller et al.

[11] 4,263,146
[45] Apr. 21, 1981

[54] PROCESS FOR REMOVING CATIONIC SUBSTANCES FROM AQUEOUS SOLUTIONS

[75] Inventors: Hans Wegmüller, Riehen; Rudolf F. Wurster, Pfeffingen, both of Switzerland

[73] Assignee: Ciba-Geigy Corporation, Ardsley, N.Y.

[21] Appl. No.: 50,563

[22] Filed: Jun. 21, 1979

[30] Foreign Application Priority Data

Jun. 29, 1978 [CH] Switzerland .................. 7098/78

[51] Int. Cl.³ ............................................. C02F 1/42
[52] U.S. Cl. ................................... 210/679; 210/681; 210/694; 210/502
[58] Field of Search ................... 210/24, 28, 36, 37 R, 210/37 B, 40, 502, 506–508, 38 R, 38 A, 38 B

[56] References Cited

U.S. PATENT DOCUMENTS

| | | | |
|---|---|---|---|
| 3,997,483 | 12/1976 | Wurster et al. | 210/36 X |
| 4,079,001 | 3/1978 | Haase et al. | 210/36 |
| 4,133,929 | 1/1979 | Bowes et al. | 428/260 |
| 4,178,438 | 12/1979 | Haase et al. | 210/502 X |
| 4,207,184 | 6/1980 | Kaiser et al. | 210/38 R |

OTHER PUBLICATIONS

Hoffpauir et al., "Ion-Exchange Characteristics of Chemically Modified Cotton Fabrics," *Textile Research Journ.*, Sep. 1950, pp. 617–620.

Möck et al., "Die Chemische Modifizierung von Cellulosel 6. Mitteilung", *Melliand Textilberichte*, Sep. 1969, pp. 1107–1111.

*Primary Examiner*—Thomas G. Wyse
*Attorney, Agent, or Firm*—Edward McC. Roberts; John P. Spitals

[57] ABSTRACT

A process for removing cationic substances from an aqueous solution, which comprises bringing the solution into contact with a cellulose-containing material which has been chemically modified anionically and in which the anionic constituent is bonded to the cellulose moiety by a grouping of the general formula

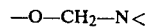

wherein the nitrogen belongs to an amide group of the anionic constituent and the oxygen atom is bonded to the cellulose.

17 Claims, No Drawings

PROCESS FOR REMOVING CATIONIC SUBSTANCES FROM AQUEOUS SOLUTIONS

The present invention relates to a process for removing cationic substances from aqueous solutions, in particular from effluents, for example filtrates, residual liquors, rinsing liquors and wash waters. The novel process comprises bringing the aqueous solutions into contact with cellulose-containing materials which are chemically modified anionically and in which the anionic constituent is bonded to the cellulose moiety via the grouping of the general formula $$-O-CH_2-N< \qquad (1)$$

in which the nitrogen belongs to an amide group of the anionic constituent and the oxygen is bonded to the cellulose moiety.

Various cellulose-containing products which can be used as cation exchangers have to date already been developed. Thus, for example, phosphorylated cellulose, half-esters of cellulose and succinic acid, carboxymethylcellulose and sulfoethoxycellulose are known as cation exchangers.

It has now been found, surprisingly, that a rapid and adequate purification of aqueous solutions containing cationic substances is achieved when these are brought into contact with anionically modified cellulose materials of the abovementioned type. Compared with known cellulose-containing cation exchangers, these cellulose materials are distinguished by a better accessibility and a higher absorbability and rate of absorption for cationic substances dissolved or dispersed in water.

The novel process is particularly suitable for the purification of aqueous liquors which contain organic cationic substances or mixtures thereof. In particular, cationic dyes, fluorescent brighteners, dyeing or textile assistants, surfactants, tanning agents and mixtures thereof can be removed from effluents to a satisfactory extent. Effluents which contain mixtures of cationic dyes with cationic assistants can successfully be purified according to the invention.

As a result of the wide field of application of the modified cellulose material, it is possible to achieve a saving of fresh water, which at present is required more and more urgently, by recirculating some or all of the residual liquors or waste liquors obtained. In particular, these liquors are, regardless of the apparatus, the effluents of the dye, fibre, textile, paper and leather industry which are obtained in connection with dyeing processes, washing processes and tanning processes. In the case of a dyehouse, for example, these effluents can originate from the customary dyeing apparatuses, such as are used for dyeing loose fibrous material, slubbings, yarn and woven fabrics or knitted fabrics, and also from cleaning equipment, for example from an open-width washing machine.

The effluents are advantageously purified at 10° to 150° C. However, they are preferably purified at 10° to 100° C., and in particular between 20° and 70° C. If desired, the effluents can also be purified under pressure or in vacuo. The pH value of the effluents can vary within wide limits, for example from 2 to 12. Adjustements of the pH, for example to a value of 2 to 9, and in particular of 5 to 8, can, however, facilitate and accelerate the purification process, depending on the nature of the modified cellulose material used as the adsorbent.

The process according to the invention can be carried out discontinuously, semi-continuously or continuously. In principle, the following embodiments are suitable within the scope of the invention: (a) the so-called stirring process in which the water to be purified is stirred with the cellulose material in a vessel or a number of vessels and is then separated off; (b) the so-called fluidised bed process in which the cellulose material is kept in suspension by the flow of liquor to be purified; and (c) the so-called fixed bed process in which the liquor to be purified is passed through a cellulose material arranged as a filter.

If, of these three process variants, the fixed bed process (c) is used, the following three apparatus variants are particularly suitable:

1. The treatment apparatus is fixedly connected to the adsorber equipment.
2. The adsorber equipment is mobile and can be coupled to any treatment apparatus as required.
3. The effluents arising from the treatment liquors are combined in a suitable tank and then passed together through the cellulose material.

Advantageous anionically modified cellulose materials are those in which the anionic constituent is bonded to the cellulose moiety by a grouping of the formula $$-O-CH_2-N-X- \qquad (2)$$
$$\qquad\qquad\quad | $$
$$\qquad\qquad\quad Y$$

in which X is a divalent bridge $-CO-$, $-CO-O$, $-CS$, $$-CON-, \;\; >C=NH, \;\; -\overset{(O)_{m-1}}{\underset{OR}{P}}-(O)_{\overline{m'-1}} \;\; or \;\; -SO_2-$$
$$\quad\; |$$
$$\quad\; Y'$$

or a carbon atom which is a constituent of a nitrogen-containing heterocyclic ring and is adjacent to the ring nitrogen, for example of a pyrimidine, triazine, 3,5-dioxo-pyrazolidine, 5-pyrazolone or 5-aminopyrazole ring, Y, Y' and R are each hydrogen or an organic radical and m and m' are in each case 1 or 2. In formula (2), X is, in particular, the $-CO-$ bridge. X is also advantageously the $-CONH-$ group. Y and Y' are preferably hydrogen or lower alkyl which is unsubstituted or substituted by halogen, cyano, hydroxyl or lower alkoxy. The substituent Y' or Y' can also be a constituent of a nitrogen-containing hetero-ring which can also incorporate the grouping $-CO-$, $-CS-$ and $>C=NH$, as in the case of derivatives of 5-pyrazolone, 5-aminopyrazole, barbituric acid, cyanuric acid or melamine. Y and Y' may also be a further grouping $-CH_2-O(R)$, which may also be bonded to the cellulose.

Preferred radicals Y and Y' are hydrogen, lower alkyl or $-CH_2O(R_1)$. R and $R_1$ are preferably hydrogen or lower alkyl.

The anionic character of the modified cellulose materials which can be used according to the invention is based on the presence of anionic or acid substituents. The chemically modified cellulose materials contain carboxylic acid groups, sulfuric acid ester or phosphoric acid ester groups, phosphonic acid groups, phosphoric acid groups, phosphoric acid half-ester groups or sulfonic acid groups as such substituents, which are bonded by the groupings of the formulae (1) and (2). These groups can be in the free form or in salt form, for example as alkali metal salts or ammonium salts. Alkali metal salts are, in particular, the sodium salts and potassium salts and ammonium salts are the ammonium, trimethylammonium, monoethanolammonium, diethanolammonium and triethanolammonium salts. The anionically modified cellulose materials are preferably used as the ammonium salts, sodium salts or potassium salts.

Preferred anionic substituents are sulfonic acid groups and phosphoric acid groups, which are advantageously present in the form of ammonium or sodium salts.

The anionic substituent can be bonded to the groupings of the formulae (1) and (2) by any desired bridge member, depending on the starting components used for the preparation of the anionically modified cellulose materials. Bridge members are, for example, divalent hydrocarbon radicals, for example lower straight-chain or branched alkylene radicals, such as the methylene, 1,2-ethylene or 1,2- or 1,3-propylene group or the 1,1- or 1,4-cyclohexylene group, aralkylene groups, for example the phenylethylene or phenyleneethylene group, or lower alkenylene radicals, such as the vinylene group.

The methylolamide and anionic groupings required for etherification and anionic modification of the cellulose materials can also be constituents of polymeric compounds, such as polycondensates, polymers or polyadducts.

Such polymeric compounds can have the general formula $$T—E_n \qquad (3)$$

in which T is a polymeric base structure which contains at least one acid group, preferably a sulfonic acid group, E is an etherified methylol group which may be bonded to an amide group and n is a number of at least 1, for example 1 to 200,000.

These polymeric compounds can be derived from homopolymers, copolymers, graft polymers or block polymers.

The acid groupings present in the base structure T are preferably sulfonic acid groups, phosphonic acid groups, phosphonic acid ester groups or sulfonic acid ester groups.

Anionic polymers containing methylol groups can be obtained, for example, by reacting polymeric compounds which contain acid groups and groupings which can be methylolated, for example carboxylic acid amide groups, sulfonic acid amide groups, phosphonic acid amide groups or aminotriazine groups, with formaldehyde or formaldehyde donors.

Suitable polymeric compounds which contain acid groups and can be methylolated are, for example, copolymers of acrylamide or methacrylamide with acrylic acid, maleic anhydride, vinylsulfonic acid or vinylphosphoric acid. If desired, methylolation of the amide group can already be carried out before the polymerisation.

It is particularly advantageous if the cellulose materials are anionically modified with a monomeric compound which contains at least one anionic group and at least one free or etherified N-methylolamide group, in particular a free or etherified N-methylolcarboxylic acid amide group, the cellulose being etherified.

Monomeric compounds, according to the invention, with an anionic group and a free or etherified N-methylolcarboxylic acid amide group are the free or etherified methylol compounds of the formula

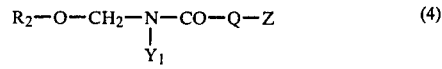

in which $Y_1$ is hydrogen, lower alkyl or $—CH_2—O—R_1$, $R_1$ and $R_2$ independently of one another are hydrogen or lower alkyl, Q is a $C_1$-$C_8$-alkylene radical which is unsubstituted or substituted by lower alkyl or phenyl and Z is a carboxyl group or the acid radical of a polybasic, inorganic, oxygen-containing acid, or $—CO—Q—Z$ is the acid radical of a dicarboxylic acid containing this inorganic acid radical, it being possible for the end carboxyl group of the dicarboxylic acid to be replaced by the group of the formula

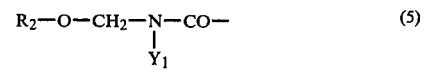

Methylolamide compounds of the formula (4) which contain only a single grouping of the formula (5) are particularly preferred. In addition, Z is preferably the sulfonic acid group or phosphoric acid group. The acid radical Z is preferably in salt form, for example as an alkali metal salt or ammonium salt. Q is advantageously $C_1$-$C_3$-alkylene, for example methylene, ethylene, propylene or isopropylene. Such methylolamide compounds of the formula (4) can be obtained, for example, by reacting an inorganic derivative of sulfurous or phosphorous acid with an amide of a 1,2-unsaturated aliphatic carboxylic acid and methylolating the reaction product with formaldehyde or a formaldehyde donor, for example paraformaldehyde or trioxan. Suitable derivatives of sulfurous or phosphorous acid are, for example, sodium bisulfite or sodium metabisulfite or sodium phosphite, or an alkali metal salt of a mono-$C_1$-$C_5$-alkyl phosphite, and suitable amides are acrylamide, methacrylamide, itaconamide, fumaramide or maleic acid amide.

Free or etherified methylolamide compounds which have the formula

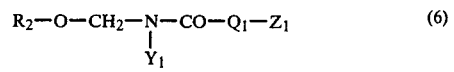

in which $Q_1$ is $C_1$-$C_3$-alkylene or $C_1$-$C_3$-alkylene which is substituted by —COOH or the group of the formula

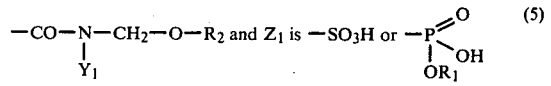

and $R_1$, $R_2$ and $Y_1$ are as defined are of particular interest in practice for the etherification and anionic modification of the cellulose materials. Methylolamide compounds of the formula (6) in which $Q_1$ is $C_1$-$C_3$-alkylene, $Z_1$ is —SO$_3$H, $R_2$ is hydrogen or methyl and $Y_1$ is hydrogen are particularly preferred.

Preferred anionically modified cellulose materials can also be obtained if the modification of the cellulose is carried out with melamine compounds or urea compounds which contain at least one free or etherified N-methylol group and at least one N-sulfo-$C_1$-$C_3$-alkyl group, in particular a N-sulfoethyl group. Free or etherified N-methylolmelamines of the formula

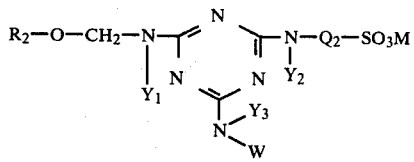  (7)

in which W is hydrogen, —$CH_2O$—$R_2$ or —$Q_2$—$SO_3M$, $Y_1$ is hydrogen, lower alkyl, —$CH_2$—O—$R_1$ or —$Q_2$—$SO_3M$, $Y_2$ and $Y_3$ independently of one another are hydrogen, lower alkyl or —$CH_2$—O—$R_1$, $R_1$ and $R_2$ are each hydrogen or lower alkyl, $Q_2$ is $C_1$-$C_3$-alkylene and M is hydrogen, sodium, potassium or ammonium, are particularly suitable. $Y_1$ is advantageously lower alkyl or —$CH_2$—O—$R_1$, and preferably hydrogen, $Y_2$ and $Y_3$ are preferably hydrogen and $Q_2$ is, in particular, ethylene.

In the definition of the radicals of the N-methylolamide compounds for modifying the cellulose materials, lower alkyl and lower alkoxy are as a rule such groups which contain 1 to 5, in particular 1 to 3, carbon atoms, for example methyl, ethyl, n-propyl, isopropyl, n-butyl, sec.-butyl or amyl, or methoxy, ethoxy or isopropoxy. Halogen in connection with all the above substituents is, for example, fluorine, bromine or, preferably, chlorine.

The anionic modification is as a rule effected by treating, for example impregnating, the cellulose materials with the anionic methylolamide compound, or mixtures for the formation thereof, in a neutral or, preferably, acid medium, for example at a pH value of 2 to 6, and thermofixing the treated cellulose materials, the cellulose being etherified, advantageously at temperatures from 20° to 200° C., preferably 50° to 150° C., and in particular until the product is dry. Mixtures of the acid methylol compounds can also be used for anionic modification of the cellulose. If desired, a catalyst can be used for the fixing. Suitable catalysts are, for example, ammonium thiocyanate, ammonium chloride, ammonium hydrogen orthophosphate, magnesium chloride, zinc nitrate, maleic acid, tartaric acid or citric acid.

The anionic methylol compounds can also be etherified with an alkanol having not more than 5 carbon atoms, for example with ethanol, propanol, butanol or, in particular, methanol.

The resulting anionically modified cellulose materials as a rule have an acid equivalent of 0.1 to 5, preferably 0.5 to 4, milliequivalents per g of anionically modified cellulose material.

If desired, aminoplast precondensates can also be used as reactants. Aminoplast precondensate is to be understood as meaning adducts of formaldehyde and nitrogen compounds which can be methylolated, for example urea compounds or thiourea compounds or 1,3,5-aminotriazines.

Suitable urea compounds and thiourea compounds are, for example, urea, thiourea, substituted ureas, such as alkyl- or aryl-ureas, alkylene-ureas and -diureas, such as ethyleneurea, propyleneurea, dihydroxyethyleneurea, hydroxypropyleneurea and acetylenediurea.

1,3,5-Aminotriazines are, for example: melamine and N-substituted melamines, such as N-butylmelamine, triazones, ammeline, guanamines, for example benzoguanamine, acetoguanamines and diguanamines, and guanidines.

Aminoplast precondensates are preferably the methylol compounds of the ureas and 1,3,5-aminotriazines mentioned. Preferred compounds are, in particular, N-methylolureas and N-methylolmelamines. Partial ethers of such methylol compounds, for example with alkanols having 1 to 5 carbon atoms, such as methanol, ethanol, n-propanol or n-butanol, can also be used.

The cellulose-containing materials to be used for anionic modification are bleached or unbleached pine sulfite cellulose, Kraft cellulose, paper, cardboard products, textile fibres of cotton, viscose staple, jute, ramie, hemp, linen or viscose, as well as peat, wood pulp, sawdust, wood fibres, wood flour, lignin cellulose, rayon fibres, cork flour, bark or cereal waste products. Waste-paper, the use of which is usually associated with problems, can also be employed. These cellulose materials are advantageously converted into a form which is suitable for the treatment with the methylol compound, for example into a fibre suspension. The cellulose can also be in the form of granules, filter paper, blotting paper or paper pulp.

If desired, the anionically modified cellulose material to be used according to the invention can be mixed with other ion exchangers or adsorbents, for example active charcoal and/or other known filtration assistants, for example peat, kieselguhr or diatomaceous earth. In this case, the active charcoal, for example, is added to the cellulose materials in amounts of up to 2 to 95% by weight, preferably 10 to 70% by weight, calculated relative to the weight of the cellulose material.

Dyes which are removed, according to the invention, from the effluents are both water-soluble and water-dispersible, cationic dyes or fluorescent brighteners. The process according to the invention is preferably suitable for removing water-soluble cationic dyes or fluorescent brighteners.

The cationic dyes are, quite generally, the usual salts and metal halide double salts, for example zinc chloride double salts, of the known cationic dyes, the cationic character of which stems from a carbonium group, oxonium group, sulfonium group and, in particular, an ammonium group. Examples of such chromophoric systems are: methine dyes, azomethine dyes, azo dyes, hydrazone dyes, azine dyes, oxazine dyes, thiazine dyes, diazine dyes, xanthene dyes, acridine dyes, polyarylmethane dyes, such as diphenylmethane dyes or triphenylmethane dyes, and coumarin dyes and azo dyes which contain an indolinium, pyrazolium, triazolium, tetrazolium, oxadiazolium, thiodiazolium, oxazolium, thiazolium, pyridinium, pyrimidinium or pyrazinium ring. Further dyes are arylazo dyes, phthalocyanine dyes and anthraquinone dyes which carry an external ammonium group, for example an external cycloalkylammonium or alkylammonium group.

The modified cellulose material is suitable not only for the decoloration of residual liquors obtained in the manufacture of dyes and in the dyeing of textiles, paper or leather, but is furthermore of good use if residues of cationic fluorescent brighteners are to be removed from wash liquors or bleaching liquors.

The cationic fluorescent brighteners can belong to any desired class of fluorescent brighteners. They are, in particular, cationic fluorescent brighteners of the methine, azamethine, benzofuran, benzimidazolyl, coumarin, naphthalimide or pyrazoline series.

Another advantage of the modified cellulose material is that, in addition to the dyes, it also enables cationic surfactants, textile assistants and dyeing assistants to be at least partly eliminated from aqueous residual liquors. Such assistants are described in more detail in the book "Tenside—Textilhilfsmittel—Waschrohstoffe" ("Surfactants—Textile Assistants—Detergent Bases") by Dr. Kurt Lindner (published by Wissenschaftlicher Verlagsgesellschaft, Stuttgart, 1964).

The anionically modified cellulose material also serves as a general cation exchanger.

Up to 100% of the dissolved impurities can be removed, according to the invention, from the effluents by suitably choosing the cellulose material. Retention effects of up to 50 g of pollutant, i.e. dye, fluorescent brightener, assistant, washing agent or tanning agent, per 100 g of cellulose material can be achieved. Residual liquors with a dye concentration of 0.01 to 1.0 g/l are preferably decolorised. In cases where it is not possible to achieve complete decoloration or removal of the pollutants by a single treatment of the residual liquor with the cellulose material, it is advisable to repeat the purification operation.

After adsorption of the impurities, the charged cellulose materials can easily be regenerated with the aid of, for example, a dilute, aqueous mineral acid solution.

A particular economic advantage of the process according to the invention is that the anionically modified cellulose materials used can, after being saturated with the pollutants, be drained off from the effluent in a simple manner, dried and then passed to a combustion process or used as additives, for example for the preparation of packing and building materials. A further advantage can be seen in the fact that the anionically modified cellulose materials can be converted in a simple manner into the desired use forms, for example fibres, chips or filter paper.

The anionically modified cellulose materials can advantageously be employed in the purification of effluents instead of flocculating agents, whereupon no problems of over-metering occur. In addition, because of the good drainage properties, sludge problems are avoided. Furthermore, the anionically modified cellulose materials are distinguished by a high retention for cationic substances in the neutral pH range. In particular, the high percolation capacity of the anionically modified cellulose materials when used in a suitable form, for example chips in the fixed bed process, is of great importance.

In the following preparation instructions and examples, percentages are always by weight.

PREPARATION INSTRUCTIONS

Instruction 1

A.

52.5 g of an adduct obtained by adding on 1 equivalent of sodium metabisulfite to 1 mol of acrylamide are dissolved in 74 ml of water, and 27.5 g of a 36% formaldehyde solution are added, after which the pH value is adjusted to 9.5 by means of 1 g of sodium hydroxide. After stirring the mixture for 24 hours, 155 g of an aqueous solution of the methylolamide compound of the formula $$NaO_3S-CH_2CH_2-CONH-CH_2OH \quad (8)$$

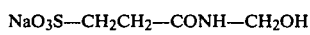

are obtained. This solution is then adjusted to pH 4 with 98% sulfuric acid and diluted with 155 g of water.

8.0 g of filter paper are impregnated with the acid solution prepared according to Instruction 1A such that 19.4 g of the acid solution are absorbed by the paper. The impregnated paper is then dried at 160° C. for 20 minutes. The product is suspended in 1 liter of water by means of a high-speed stirrer. The paper pulp is then filtered off, washed with water and dried at 50° C. in vacuo. The fibrous cation exchanger contains 0.6 milliequivalent/g of sulfonic acid groups.

Instruction 2

A.

47.5 g of the reaction product obtained by reacting sodium taurate and ethylurethane are stirred in 118 ml of water, and 42 g of a 35.7% formaldehyde solution are added. After stirring the mixture at 50° C. and at a pH value of 9.5 for 24 hours, 208 g of an aqueous solution of the methylolamide compound of the formula $$NaO_3S-CH_2CH_2-NH-CO-NH-CH_2OH \quad (9)$$

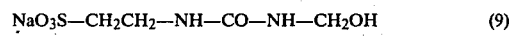

are obtained. This solution is then adjusted to pH 4 with concentrated hydrochloric acid (37%).

B.

8.0 g of filter paper are impregnated with the acid solution prepared according to Instruction 2A, such that 24 g of the acid solution are absorbed by the paper. The impregnated paper is then dried at 160° for 10 minutes. The product is suspended in 1 liter of water by means of a high-speed stirrer. The paper pulp is filtered off, washed with water and dried at 50° C. in vacuo. The fibrous cation exchanger contains 1.0 milliequivalent/g of sulfonic acid groups.

Instruction 3

A.

39.4 g of sodium β-carbamidoethylphosphonate are dissolved in 120 ml of water and methylolated with 33.6 g of a 35.7% formaldehyde solution at 40° C. and at pH 8-9 for 24 hours. 193 g of an aqueous solution of the methylolamide compound of the formula $$HO-CH_2-NH-CO-CH_2CH_2-\underset{\underset{O}{\|}}{P}(OA)_2 \quad A = H\ Na \quad (10)$$

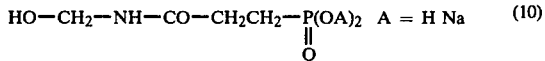

are obtained. This solution is then adjusted to pH 4 with concentrated hydrochloric acid.

B.

8.0 g of filter paper are impregnated with the acid solution prepared according to Instruction 3A such that 21 g of the acid solution are absorbed by the paper. The impregnated paper is then dried at 140° C. for 10 minutes. The product is suspended in 1 liter of water by means of a high-speed stirrer. The paper pulp is then filtered off, washed with water and dried at 50° C. in vacuo. The fibrous cation exchanger contains 0.74 milliequivalent/g of phosphorus.

Instruction 4

A.

48 g of sulfo-succinic acid monoamide are dissolved in 119 g of water at a pH value of 9, aqueous sodium hydroxide solution being added, and methylolated with 18.5 g of a 35.7% formaldehyde solution at 50°–55° C.

195 g of an aqueous solution of the methylolamide compound of the formula $$\underset{NaO_3S-CH-CO-NH-CH_2OH}{\overset{CH_2-COONa}{|}} \quad (11)$$

are obtained. This solution is then adjusted to pH 4 with concentrated hydrochloric acid.

B.

8.0 g of filter paper are impregnated with the acid solution prepared according to Instruction 4A such that 25 g of the acid solution are absorbed by the paper. The impregnated paper is then dried at 140° C. for 10 minutes. The product is suspended in 1 liter of water by means of a high-speed stirrer. The paper pulp is then filtered off, washed with water and dried at 50° C. in vacuo. The fibrous cation exchanger contains 0.93 milliequivalent/g of sulfonic acid groups.

Instruction 5

A.

37.8 g of sodium γ-carbamidopropanesulfonate are dissolved in 110 g of water and methylolated with 18.5 g of a 35.7% formaldehyde solution at 50°–60° C. for 6 hours. An aqueous solution of the methylolamide compound of the formula $$NaO_3S-CH_2CH_2CH_2-CO-NH-CH_2OH \quad (12)$$

is obtained. This solution is then adjusted to pH 4 with concentrated hydrochloric acid.

B.

8.0 g of filter paper are impregnated with the acid solution prepared according to Instruction 5A such that 25 g of the acid solution are absorbed by the paper. The impregnated paper is then dried at 140° C. for 10 minutes. The product is suspended in 1 liter of water by means of a high-speed stirrer. The paper pulp is then filtered off, washed with water and dried at 50° C. in vacuo. The fibrous cation exchanger contains 0.97 milliequivalent/g of sulfonic acid groups.

Instruction 6

A.

72.7 g of 2,4-diamino-6-chloro-s-triazine and 84.5 g of sodium taurate are suspended in 500 ml of water. The mixture is heated to 90°–95° C. in the course of 45 minutes and kept at a pH value of 9–9.5 for 3 hours, 120 ml of 5 N sodium hydroxide solution being added. Thereafter, the reaction mixture is allowed to cool to room temperature and the pH value is adjusted to 7.0 with 2 N hydrochloric acid, after which, after concentrating the reaction mixture to 250 ml in vacuo and filtering off the product formed, 118 g of a sulfoethylated melamine compound are obtained.

85.3 g of this melamine compound are then initially introduced into 252 ml of water and are methylolated with 58.8 g of a 35.7% formaldehyde solution at 50°–55° C. and at a pH value of 9–9.5 for 24 hours. 461 g of an aqueous solution of the methylolmelamine compound of the formula

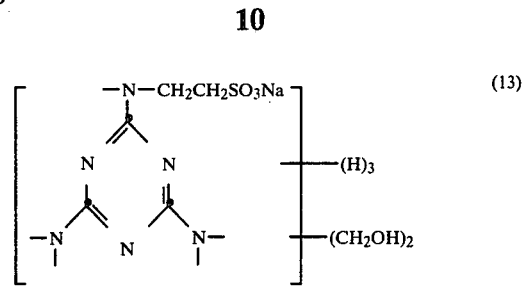

are obtained. This solution is then adjusted to pH 4 with concentrated hydrochloric acid.

B.

8.0 g of filter paper are impregnated with the acid solution prepared according to Instruction 6A such that 21.4 g of the acid solution are absorbed by the paper. The impregnated paper is then dried at 160° C. for 10 minutes. The product is suspended in 1 liter of water by means of a high-speed stirrer. The paper pulp is then filtered off, washed with water and dried at 50° C. in vacuo. The fibrous cation exchanger contains 0.9 milliequivalent/g of sulfonic acid groups.

Instruction 7

A.

25 g of 2-amino-4,6-dichloro-s-triazine are dissolved in 80 ml of acetone and the solution is added to 120 ml of water at 0° C., with stirring. 38 g of taurine are then introduced and the reaction mixture is warmed to 50° C. The pH value is kept continuously at 8.5–9, 5 N sodium hydroxide solution being added. After 90 minutes, the reaction mixture dissolves, after which the temperature is increased to 80° C. and the acetone is distilled off. After stirring the reaction solution thoroughly at room temperature for 14 hours, 700 ml of ethanol are added to the solution, after which the product precipitates. After filtering off the precipitate, 54.3 g of a disulfoethylated melamine compound are obtained. 41.6 g of this compound are initially introduced into 102 ml of water and are methylolated with 25.2 g of a 35.7% formaldehyde solution at 50°–55° C. for 18 hours. After a reaction time of 18 hours, 168 g of an aqueous solution of the methylolmelamine compound of the formula

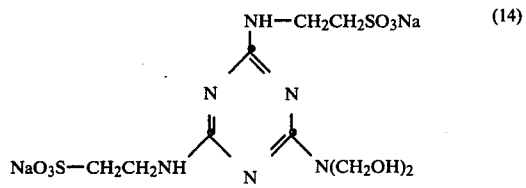

are obtained. This solution is then adjusted to pH 4 with concentrated hydrochloric acid.

B.

8.0 g of filter paper are impregnated with the acid solution prepared according to Instruction 7A such that 21.8 g of the acid solution are absorbed by the paper. The impregnated paper is then dried at 140° C. for 10 minutes. The product is suspended in 1 liter of water by means of a high-speed stirrer. The paper pulp is then filtered off, washed with water and dried at 50° C. in vacuo. The fibrous cation exchanger contains 1 milliequivalent/g of sulfonic acid groups.

Instruction 8

A.

37 g of cyanuric chloride are dissolved in 80 ml of acetone and the solution is added to 120 ml of water at 0° C., with stirring. 75 g of taurine are then mixed in. The mixture is adjusted to pH 7 by means of 5 N sodium hydroxide solution and warmed to 90° C. in the course of 3 hours, whereupon the acetone is distilled off. The pH value is adjusted to 10 by adding further 5 N sodium hydroxide solution. The mixture is kept at 90° C. for 2½ hours, after which a solution is obtained. The solution is then cooled to room temperature and 1,500 ml of ethanol are added, after which the product precipitates. 89.5 g of a white tri-sulfoethylated melamine compound which contains 18.1% of sulfur are obtained.

51.6 g of this compound are stirred in 125 ml of water and methylolated with 25.2 g of a 35.7% formaldehyde solution at 50°–55° C. for 5 hours. 202 g of an aqueous solution of a melamine compound of the formula

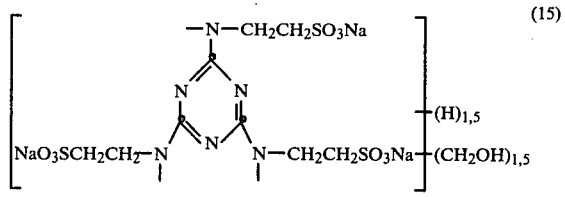

(15)

are obtained. This solution is then adjusted to pH 4 with concentrated hydrochloric acid.

B.

8.0 g of filter paper are impregnated with the acid solution prepared according to Instruction 8A such that 22 g of the acid solution are absorbed by the paper. The impregnated paper is then dried at 140° C. for 10 minutes. The product is suspended in 1 liter of water by means of a high-speed stirrer. The paper pulp is then filtered off, washed with water and dried at 50° C. in vacuo. The fibrous cation exchanger contains 1.9 milliequivalents/g of sulfonic acid groups.

Instruction 9

A.

30 g of a polymer of the formula

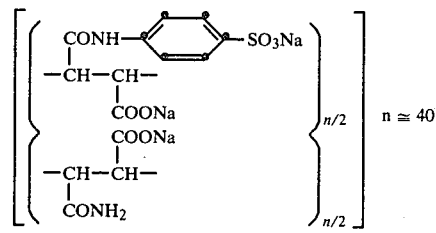

(16)

are suspended in 100 ml of water and methylolated with 8.4 g of a 35.7% formaldehyde solution at 50°–55° C. and at a pH value of 9 for 25 hours. 151 g of an aqueous solution of a polymeric methylolamide compound of the formula

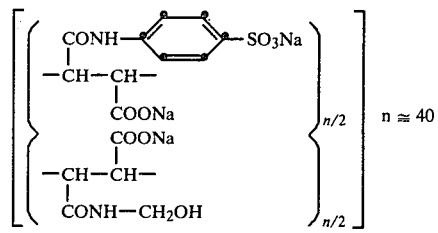

(17)

are obtained. This solution is then adjusted to pH 4 with concentrated hydrochloric acid.

B.

8.0 g of filter paper are impregnated with the acid solution prepared according to Instruction 9A such that 23 g of the acid solution are absorbed by the paper. The impregnated paper is then dried at 140° C. for 10 minutes. The product is suspended in 1 liter of water by means of a high-speed stirrer. The paper pulp is then filtered off, washed with water and dried at 50° C. in vacuo. The fibrous cation exchanger contains 0.4 milliequivalent/g of sulfonic acid groups.

Instruction 10

7.7 g of filter paper are impregnated with a solution, adjusted to pH 4, having the composition: 40 parts of the methylolamide compound of the formula (8), 4 parts of dimethylolmelamine and 56 parts of water/5 N hydrochloric acid, such that 24.3 g of this solution are absorbed by the paper. The impregnated paper is dried at 140° C. for 20 minutes and then worked up as described in Instruction 1B. 9.4 g of an adsorption material with a sulfur content of 0.7% are obtained.

Similarly good cation exchanger materials are obtained if natural fibres, for example linen, jute or sulfite cellulose pulps, cotton yarn, cotton fabric, viscose yarn or viscose fabric, are employed in Instructions 1B to 9B and 10 in place of the filter paper.

EXAMPLE 1

5 l of a yellow-coloured residual liquor which has been adjusted to a pH value of 7.0 and contains 0.1 g/l of a dye of the formula

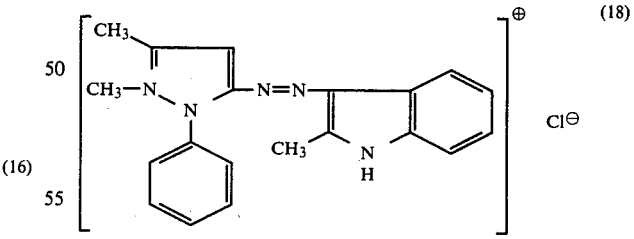

(18)

in dissolved form are initially introduced into a stirred vessel. The residual liquor is warmed to a temperature of 50° C. and 0.1 g/l of the anionically modified cellulose material which has been prepared according to Instruction 1B and has first been suspended in 50 ml of water is added. A sample is in each case taken after a decoloration time of 1, 5, 15 and 60 minutes and is filtered over a polypropylene filter, and the percentage decoloration of the filtrate indicated in Table 1 is established, using a blank test with the same amount of unmodified cellulose material for comparison.

TABLE 1

| Adsorption material | % decoloration after X minutes | | | |
| --- | --- | --- | --- | --- |
| | 1 | 5 | 15 | 60 |
| 100 mg/l of anionically modified cellulose material according to Instruction 1B | 49 | 69 | 73 | 73 |
| 100 mg/l of unmodified cellulose fibres | 2.1 | 2.0 | 3.3 | 3.5 |

EXAMPLES 2 TO 10

5 l of a blue-coloured residual liquor which has been adjusted to a pH value of 7.0 and contains 0.1 g/l of a dye of the formula

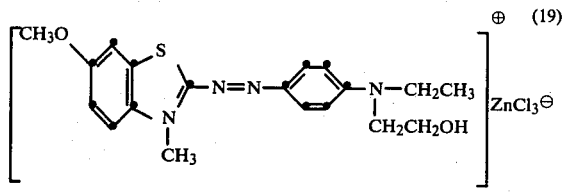

in dissolved form are initially introduced into a stirred vessel. The residual liquor is warmed to a temperature of 50° C. and 0.5 g of an anionic adsorption material which has been prepared according to Instructions 2 to 10 and which has first been suspended in 50 ml of water is added. After a decoloration time of 60 minutes, a sample is in each case taken and is filtered over a polypropylene filter, showing the percentage decoloration of the filtrate indicated in Table 2.

TABLE 2

| Example No. | Adsorbent prepared according to instruction | % decoloration |
| --- | --- | --- |
| 2 | 2B | 81 |
| 3 | 3B | 39 |
| 4 | 4B | 51 |
| 5 | 5B | 64 |
| 6 | 6B | 55 |
| 7 | 7B | 67 |
| 8 | 8B | 76 |
| 9 | 9B | 35 |
| 10 | 10 | 26 |

What is claimed is:

1. A process for removing cationic substances from an aqueous solution, which comprises bringing the solution into contact with a cellulose-containing material which has been chemically modified anionically, the anionic constituent of which is bonded to the cellulose moiety by a grouping of the general formula $$-O-CH_2-N< \qquad (1)$$

wherein the nitrogen atom is part of an amide group of the anionic constituent and the oxygen atom is bonded to the cellulose moiety.

2. A process according to claim 1, wherein the anionic constituent of the modified cellulose material is bonded to the cellulose moiety via a grouping of the formula

wherein X is a divalent bridge —CO—, —CO—O—, —CS—,

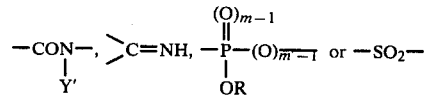

or —SO$_2$— or a carbon atom which is a constituent of a nitrogen-containing heterocyclic ring and is adjacent to a ring nitrogen, Y, Y' and R are each hydrogen or an organic radical and m and m' are in each case 1 or 2.

3. A process according to claim 2, wherein the anionic constituent of the modified cellulose material is bonded to the cellulose moiety by a grouping of the formula (2) in which Y and Y' are each hydrogen, lower alkyl or —CH$_2$O(R$_1$) and R and R$_1$ are each hydrogen or lower alkyl.

4. A process according to claim 2, wherein the anionic constituent of the modified cellulose material is bonded to the cellulose moiety by a grouping of the formula (2) in which X is the —CO— group.

5. A process according to claim 4, wherein the anionic constituent of the modified material is derived from a free or etherified methylol compound of the formula

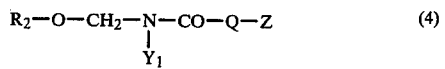

wherein Y$_1$ is hydrogen, lower alkyl or —CH$_2$—O—R$_1$, R$_1$ and R$_2$ independently of one another are hydrogen or lower alkyl, Q is C$_1$-C$_8$-alkylene which is unsubstituted or substituted by a substituent selected from the group consisting of lower alkyl, phenyl, —COOH and the group of the formula

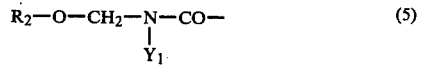

and Z is a sulfonic acid group or phosphonic acid group.

6. A process according to claim 5, wherein the anionic constituent of the modified cellulose material is derived from a methylolamide compound of the formula (4), wherein Z is a sulfonic acid group.

7. A process according to claim 5, wherein the anionic constituent of the modified cellulose material is derived from a methylolamide compound of the formula (4) wherein Q is C$_1$-C$_3$-alkylene.

8. A process according to claim 5, wherein the anionic constituent of the modified cellulose material is derived from a methylolamide compound of the formula

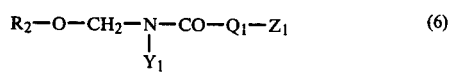

wherein Q$_1$ is C$_1$-C$_3$-alkylene or C$_1$-C$_3$-alkylene which is substituted by —COOH or the group of the formula

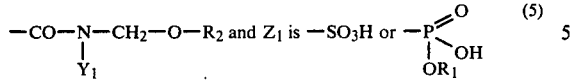

and $R_1'$ is hydrogen.

9. A process according to claim 8, wherein the anionic constituent of the modified cellulose material is derived from a methylolamide compound of the formula (6) in which $Q_1$ is $C_1$-$C_3$-alkylene, $Z_1$ is —$SO_3H$, $R_2$ is hydrogen or methyl and $Y_1$ is hydrogen.

10. A process according to claim 1, wherein the anionic constituent of the modified cellulose material is derived from a melamine compound or urea compound which contains at least one free or etherified methylol group and at least one sulfo-$C_1$-$C_3$-alkyl group.

11. A process according to claim 10, wherein the anionic constituent of the modified cellulose material is derived from a free or etherified N-methylolmelamine of the formula

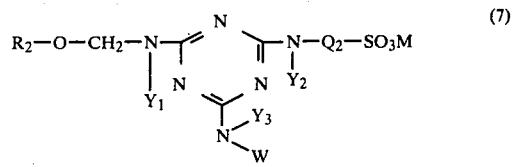

in which W is hydrogen, —$CH_2O$—$R_2$ or —$Q_2$—$SO_3M$, $Y_1$ is hydrogen, lower alkyl, —$CH_2$—O—$R_1$ or —$Q_2$—$SO_3M$, $Y_2$ and $Y_3$ independently of one another are hydrogen, lower alkyl or —$CH_2$—O—$R_1$, $R_1$ and $R_2$ are each hydrogen or lower alkyl, $Q_2$ is $C_1$-$C_3$-alkylene and M is hydrogen, sodium, potassium or ammonium.

12. A process according to claim 11, wherein the anionic constituent of the modified cellulose material is derived from a methylolmelamine of the formula (7) in which $Y_1$ is hydrogen, lower alkyl or —$CH_2OR_1$.

13. A process according to claim 1, wherein the cationic substances are cationic dyes, fluorescent brighteners, textile assistants or dyeing assistants, surfactants, tanning agents or mixtures of these cationic substances.

14. A process according to claim 1, wherein the removal of the cationic substances is carried out at 10° to 150° C.

15. A process according to claim 14 wherein the removal of the cationic substances is carried out at 20° to 100° C.

16. A process according to claim 1, wherein the removal of the cationic substances is carried out in a stirred process or in a fixed bed process.

17. A process according to claim 1, wherein the anionically modified cellulose-containing material is mixed with active charcoal.

* * * * *